US012571355B1

(12) United States Patent
Lemke

(10) Patent No.: US 12,571,355 B1
(45) Date of Patent: Mar. 10, 2026

(54) POWER SYSTEMS AND METHODS TO IMPROVE ENGINE FUEL EFFICIENCY USING AN ENERGY STORAGE DEVICE

(71) Applicant: Illinois Tool Works Inc., Glenview, IL (US)

(72) Inventor: Brandon Lemke, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/926,735

(22) Filed: Oct. 25, 2024

(51) Int. Cl.
| *F02D 29/06* | (2006.01) |
| *H02P 9/04* | (2006.01) |
| *H02P 101/25* | (2016.01) |
| *H02P 101/45* | (2016.01) |

(52) U.S. Cl.
CPC ................ *F02D 29/06* (2013.01); *H02P 9/04* (2013.01); *F02D 2200/101* (2013.01); *H02P 2101/25* (2015.01); *H02P 2101/45* (2015.01)

(58) Field of Classification Search
CPC ...... F02D 29/06; F02D 2200/101; H02P 9/04; H02P 2101/25; H02P 2101/45
See application file for complete search history.

(56) References Cited

U.S. PATENT DOCUMENTS

| 3,347,092 | A | * | 10/1967 | Stutson | ................... G01F 9/001 |
| | | | | | 701/123 |
| 4,475,380 | A | * | 10/1984 | Colovas | .............. B60R 16/0236 |
| | | | | | 73/114.53 |
| 4,774,858 | A | * | 10/1988 | Ganoung | ............... B60W 10/11 |
| | | | | | 477/110 |
| 8,818,595 | B2 | * | 8/2014 | Tamagawa | .............. F02D 29/02 |
| | | | | | 180/65.285 |
| 8,880,258 | B2 | | 11/2014 | Breton | |
| 9,028,362 | B2 | | 5/2015 | He | |
| 9,475,486 | B2 | * | 10/2016 | Tamagawa | .............. B60L 50/15 |
| 11,612,950 | B2 | * | 3/2023 | Radtke | ................. B23K 9/1062 |
| | | | | | 219/133 |
| 2002/0084769 | A1 | * | 7/2002 | Iritani | .................. B60H 1/3208 |
| | | | | | 903/903 |
| 2005/0173179 | A1 | * | 8/2005 | Amanuma | ............ B60W 10/26 |
| | | | | | 180/247 |
| 2011/0246005 | A1 | * | 10/2011 | King | ................. B60W 50/0097 |
| | | | | | 180/65.265 |
| 2011/0295433 | A1 | * | 12/2011 | Evans | ................... B60W 10/08 |
| | | | | | 700/282 |
| 2012/0253576 | A1 | * | 10/2012 | Tamagawa | ............ B60W 10/08 |
| | | | | | 180/65.265 |
| 2014/0330467 | A1 | * | 11/2014 | Tamagawa | ............. B60K 6/442 |
| | | | | | 701/22 |

* cited by examiner

*Primary Examiner* — Tulsidas C Patel
*Assistant Examiner* — Thomas K Quigley
(74) *Attorney, Agent, or Firm* — McAndrews Held & Malloy, Ltd.

(57) ABSTRACT

Disclosed example engine-driven power systems include: an engine configured to output mechanical power; a generator configured to convert the mechanical power to first electrical power; an energy storage device configured to be charged using the first electrical power and to discharge stored energy to output second electrical power; and control circuitry configured to: determine a load on the engine and an engine speed; and control charging or discharging of the energy storage device to increase a fuel efficiency of the engine based on a predetermined relationship between the load on the engine, the engine speed, and the fuel consumption of the engine.

15 Claims, 5 Drawing Sheets

POWER SYSTEMS AND METHODS TO IMPROVE ENGINE FUEL EFFICIENCY USING AN ENERGY STORAGE DEVICE

FIELD OF THE DISCLOSURE

This disclosure relates generally to engine-driven power systems and, more particularly, to power systems and methods to improve engine fuel efficiency using an energy storage device.

BACKGROUND

In general, the power output of a gasoline or diesel powered internal combustion engine is proportional to the engine speed. The engine of conventional engine-powered power sources typically runs at an idle speed such as 1500 rpm, 1800 rpm, or 2400 rpm, when the machine is not loaded. When a load is applied, the engine speed is increased to supply power to the load.

SUMMARY

Power systems and methods to improve engine fuel efficiency using an energy storage device are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
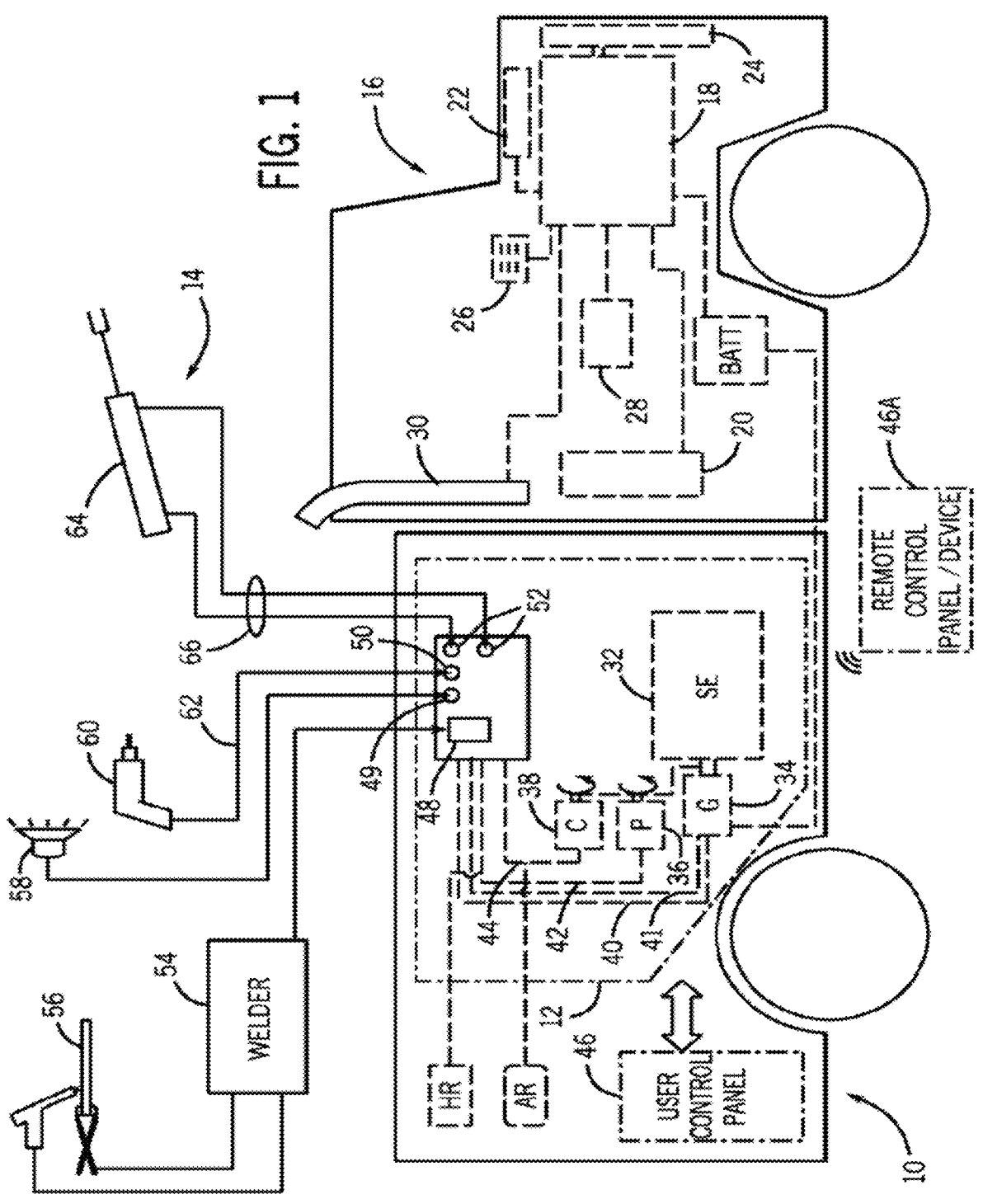
FIG. 1 is a diagrammatical overview of a work vehicle in which a service pack is installed, in accordance with aspects of the present disclosure.

Conventional engine-driven power systems operate at variable speeds to both meet the output demands of the power systems and to reduce fuel consumption during times of lower loads. Many conventional engines runs less efficiently at lower load levels and/or higher load levels, with corresponding lower and higher engine speeds. While conventional engines may operate at highest efficiency at a particular engine speed and load, such efficiency is not typically achieved with regularity in conventional engines and use cases.

Disclosed example power systems and methods have improved fuel efficiency by intentionally and automatically modifying the engine load using an energy storage device to operate the engine in more fuel-efficient operational states. In some disclosed examples, a rechargeable battery (or other energy storage device) is charged or discharged to add or subtract loads from the engine, allowing the engine to be operated at more efficient combinations of speed and load while also supplying the required output to the load systems (e.g., welding-type power supplies, air compressors, AC and/or DC electrical output, hydraulic output, etc.).

In some examples, additional components of the power system may be considered for determination of the fuel efficiency, and the energy storage device may be charged and discharged to improve a fuel efficiency of the overall power system, which may be different under different loading scenarios. Each part of the power system may have a different efficiency at different engine speeds and loads. For example, the engine may run most efficiently at a 10 kW load at 2200 RPM, while the generator may run most efficiently at a 7 kW load at 2300 RPM, and the weld converter may run most efficiently at a 9 kW load. Additional or alternative subsystems powered by the engine and/or by the generator may have other operating efficiencies that may be considered for determining a total system efficiency. Disclosed examples may use a predetermined relationship involving the efficiencies of the different components for determining the charging loads to be added to the system and/or the energy to be provided from the energy storage device to adjust the load(s) on the components of the system.

Disclosed example engine-driven power systems include: an engine configured to output mechanical power; a generator configured to convert the mechanical power to first electrical power; an energy storage device configured to be charged using the first electrical power and to discharge stored energy to output second electrical power; and control circuitry configured to: determine a load on the engine and an engine speed; and control charging or discharging of the energy storage device to increase a fuel efficiency of the engine based on a predetermined relationship between the load on the engine, the engine speed, and the fuel consumption of the engine.

In some example engine-driven power systems, the predetermined relationship includes a brake specific fuel consumption map, the system further including a storage device configured to store the brake specific fuel consumption map. Some example engine-driven power systems further include welding-type power conversion circuitry configured to convert at least a portion of the first electrical power to welding-type output power. In some example engine-driven power systems, the welding-type power conversion circuitry is configured to convert at least a portion of the second electrical power to the welding-type output power, and the control circuitry is configured to control input of the first electrical power and the second electrical power to the welding-type power conversion circuitry to increase the fuel efficiency of the engine.

In some example engine-driven power systems, the control circuitry is configured to control the engine speed of the engine to increase the fuel efficiency of the engine based on the predetermined relationship. In some example engine-driven power systems, the control circuitry is configured to control at least one of the charging or discharging of the energy storage device or the engine speed based on a charge state of the energy storage device.

Some example engine-driven power systems further include a load sensor configured to measure the load on the engine. In some example engine-driven power systems, the control circuitry is configured to determine the load on the engine and the engine speed using an engine control unit. Some example engine-driven power systems further include a charging circuit configured to convert the first electrical power to charge the energy storage device, in which the control circuitry is configured to control the charging circuit to charge the energy storage device to increase the load on the engine to improve the fuel efficiency when the fuel efficiency is less than a calculated fuel efficiency based on the engine speed.

Some example engine-driven power systems further include a discharging circuit configured to convert the second electrical power to supplement the first electrical power, in which the control circuitry is configured to control the discharging circuit to discharge the energy storage device to reduce the load on the engine to improve the fuel efficiency when the fuel efficiency is less than a calculated fuel efficiency based on the engine speed. Some example engine-driven power systems further include a charging circuit configured to convert the first electrical power to charge the energy storage device, in which the control circuitry is configured to control the charging circuit to charge the energy storage device to increase the load on the engine and adjust the engine speed to improve the fuel efficiency.

Some example engine-driven power systems further include a discharging circuit configured to convert the second electrical power to supplement the first electrical power, in which the control circuitry is configured to control the discharging circuit to discharge the energy storage device to reduce the load on the engine and adjust the engine speed to improve the fuel efficiency. In some example engine-driven power systems, the control circuitry is configured to control charging or discharging of the energy storage device to increase a combined efficiency of the engine and the generator based on a load on the generator and a predetermined relationship between the load on the generator and an efficiency of the generator.

Some example engine-driven power systems further include: a rectifier configured to rectify the first electrical power; a boost converter configured to convert the rectified first electrical power to intermediate power; and a switched mode power supply configured to convert the intermediate power to output power, in which the control circuitry is configured to control the switched mode power supply based on an output load, and control, based on an efficiency of the boost converter corresponding to the engine speed, at least one of the charging or discharging of the energy storage device or the engine speed to increase a fuel efficiency of the engine.

In some example engine-driven power systems, the control circuitry is configured to update the predetermined relationship in response to measurements of the load on the engine, the engine speed, and the fuel consumption by the engine. In some example engine-driven power systems, the control circuitry is configured to track fuel conservation relative to fuel consumption that would occur without charging and discharging of the energy storage device based on the predetermined relationship.

Disclosed example methods to control an engine-driven power system involve: outputting mechanical power using an engine; converting the mechanical power to first electrical power using a generator; determining, via control circuitry, a load on the engine and an engine speed of the engine; in response to determining that the load on the engine is less than a load based on a predetermined fuel efficiency relationship and the engine speed, controlling, via the control circuitry, a charging circuit to convert at least a portion of the first electrical power to charge an energy storage device to increase the load on the engine to increase fuel efficiency of the engine; and in response to determining that the load on the engine is more than the load based on the predetermined fuel efficiency relationship and the engine speed, controlling, via the control circuitry, a power conversion circuit to second electrical power from the energy storage device to supplement the first electrical power to increase the fuel efficiency of the engine.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. As used herein, the terms "power system," "service pack" and "auxiliary power unit" refer to an engine driven power source which may be auxiliary or supplemental to a primary power source such as a vehicle engine. The work vehicle 10 has a main vehicle power plant 16 based around a vehicle engine 18. Example work vehicle engines of this type may be diesel engines, gasoline engines, mixed ethanol-gasoline engines, a hydrogen engine, and/or another type of fuel-supplied engine.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lubricant oil system 28 will typically be included for many engine types, such as for diesel engines. As will be appreciated by those skilled in the art, such lubricant oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 110 VAC and/or 220V AC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack 12 can provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Conventional engines, such as diesel engines, may operate at different efficiencies based on the load on the engine and the controlled engine speed. The relationships between load on the engine, the engine speed, and the fuel consumption (or fuel efficiency) may be expressed as a map or chart. Such relationships may be predetermined and stored in a control system of the engine. Conventional engines may reduce fuel consumption by, for example, decreasing an engine speed to an idle speed when no load or a small load is present, and/or by reducing a number of engine cylinders that are operated under low load conditions. However, conventional engines and power systems are not equipped to control the fuel efficiency while under a substantial load. As disclosed in more detail below, disclosed example power systems 200 include an energy storage device that may be charged and discharged to control an operating point of the engine (e.g., load and speed), thereby allowing for improvements to the fuel efficiency of the engine under load.

Figure 2A:
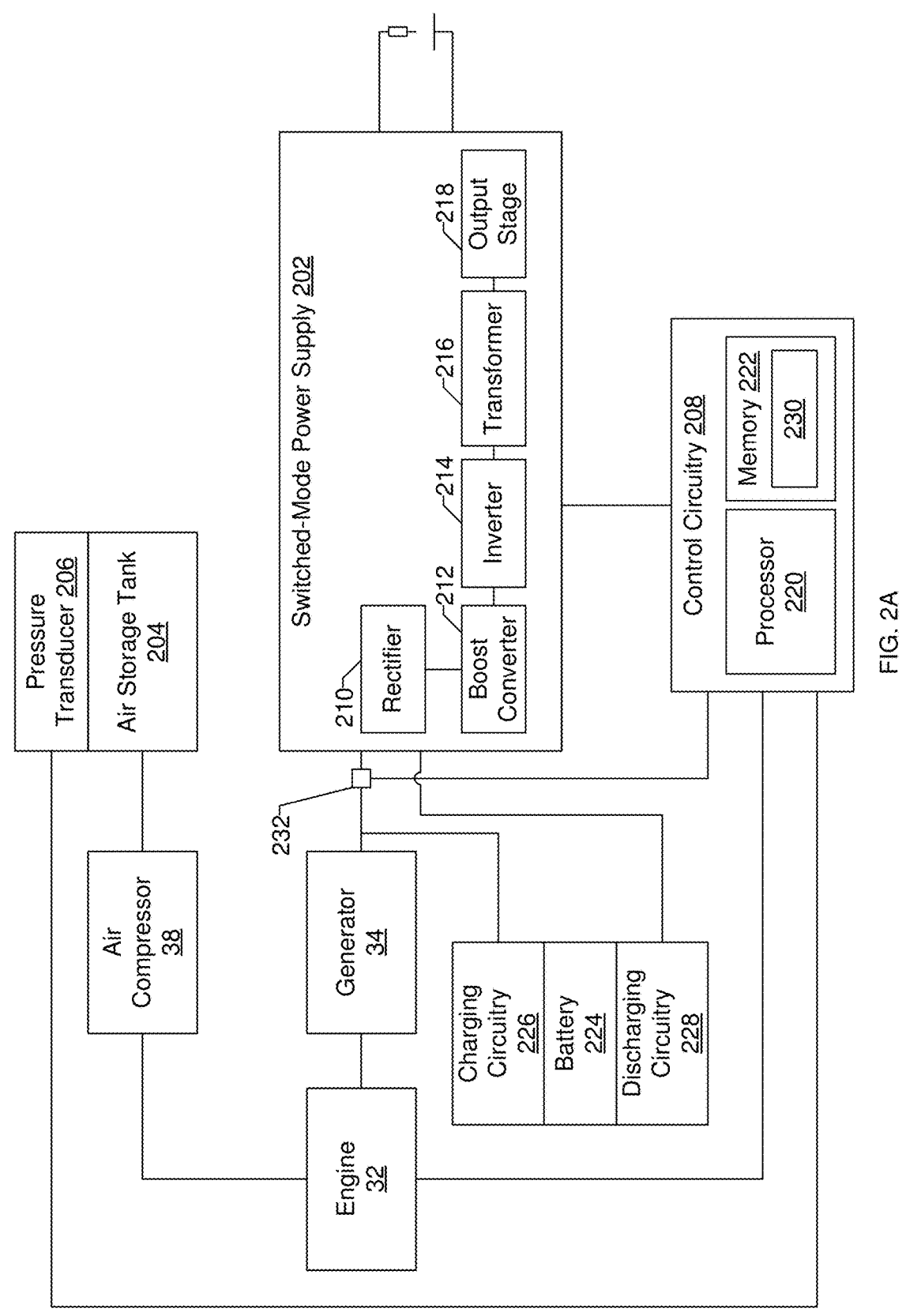
FIG. 2A is a block diagram of an example power system that may be used to implement the service pack of FIG. 1.

FIG. 2A is a block diagram of an example power system 200 that may be used to implement the service pack 12 of FIG. 1. The example power system 200 includes the service engine 32, the generator 34, the air compressor 38, a switched mode power supply 202, an air storage tank 204, a pressure transducer 206, and control circuitry 208.

The switched mode power supply 202 converts the electrical power from the generator 34 to output power. Generally, the switched mode power supply 202 includes a rectifier 210, a boost converter 212, an inverter 214, a transformer 216, and an output stage 218. However, other configurations of the switched mode power supply 202 may be used. The output power may include welding-type power, and/or non-welding AC and/or DC electrical power (e.g., DC battery charging power). In some examples, the generator 34 outputs AC power at a predetermined voltage (e.g., 115 VAC, 240 VAC) and a predetermined frequency (e.g., 50 Hz, 60 Hz, 400 Hz).

The control circuitry 208 includes one or more processor(s) 220 and a machine readable memory 222 or other storage device to store instructions for execution by the processor(s) 220. The example control circuitry 208 controls the output of the switched mode power supply 202 based on the desired load or task, and controls the speed of the engine 32 to control an input to the switched mode power supply 202 (via the generator 34). For example, the control circuitry 208 may control switching elements of the boost converter 212 and/or the inverter 214 stages to control voltage, current, frequency, and/or other characteristics of the output from the switched mode power supply 202. The control circuitry 208 may control the switched mode power supply 202 to provide voltage-controlled welding power, current-controlled welding power, battery-charging power, AC power for electrical tools, and/or any other type of welding type and/or non-welding-type electrical power.

The control circuitry 208 further controls the speed of the engine 32 based on the load on the engine 32. For example, the control circuitry 208 controls the engine 32 to be at an idle speed when the load on the engine 32 is less than a threshold load. As the control circuitry 208 identify an increase in the load, the control circuitry 208 incrementally increases the engine speed.

The air compressor 38 provides air pressure to the air storage tank 204, from where the air pressure is output to operate pneumatic tools. The pressure transducer 206 monitors the pressure in the air storage tank 204. For example, the pressure transducer 206 may sample the pressure in the air storage tank 204 at a sampling interval (e.g., 1 second, 2 seconds, etc.), and provide the air pressure to the control circuitry 208. The control circuitry 208 determines a rate of change of the air pressure in the air storage tank 204.

If the rate of change of the air pressure satisfies a threshold (e.g., the rate of change of the air pressure is less than 0, or indicates that the air pressure is decreasing), the control circuitry 208 may increase the speed of the engine 32 to increase the rate at which the air compressor 38 supplies air to the air storage tank 204. In the example of FIG. 2, instead of selecting preset engine speeds, the control circuitry 208 modifies the speed of the engine 32 incrementally. Example increments may be between 1 and 100 rotations per minute (RPM), between 10 and 50 RPM, and/or between 10 and 20 RPM. However, any other increment may be used.

As the engine speed increases, the air compressor 38 adds air to the air storage tank 204 at incrementally faster rates, until the rate of change of the air pressure no longer satisfies the threshold rate. For example, when the air compressor 38 is adding at least as much air to the air storage tank 204 as is being used by the pneumatic tool (or otherwise exiting the air storage tank 204), the control circuitry 208 may stop increasing the speed of the engine 32. However, other thresholds may be used, such as a rate that adds air pressure at a predetermined amount per unit time.

When the air pressure in the air storage tank 204 reaches an air pressure limit (e.g., user-defined, default, etc.), the control circuitry 208 decreases the speed of the engine 32. For example, the control circuitry 208 may decrement the speed of the engine 32 and/or reduce the speed of the engine 32 to the idle speed (e.g., subject to other loads on the engine 32, such as the switched mode power supply 202 and/or AC auxiliary power loads).

Additionally or alternatively to incrementing the engine speed based on the air compressor load, the example control circuitry 208 may control the speed of the engine 32 based on the input current to the switched mode power supply 202. As the load on the switched mode power supply 202 increases, the boost converter 212 draws a larger current from the generator 34 to maintain a target bus voltage (e.g., an input voltage to the inverter 214). The example power system 200 includes a current sensor 232 (e.g., an ammeter, a current transformer, etc.) configured to measure an input current to the switched mode power supply 202. In some examples, the current sensor 232 monitors the rectified current input to the boost converter 212.

When the measured input current increases above a threshold current, the example control circuitry 208 increases a speed of the engine 32, which causes the generator 34 to increase an output voltage to the switched mode power supply 202, thereby reducing the current. The control circuitry 208 increases the engine speed incrementally until the input current is less than the threshold. Conversely, as the input current to the boost converter drops below a lower threshold, the example control circuitry 208 may decrement the speed of the engine 32 and/or decrease the speed to the idle speed in response to the reduced load.

While example loads are described above, the control circuitry 208 may increment and/or decrement the engine speed based on other loads on the engine 32, such as hydraulic loads.

In addition to controlling the engine speed based on the load, the example control circuitry 208 also controls charging and discharging of a battery 224 to increase a fuel efficiency of the engine 32. The battery 224 is coupled to an output of the generator 34 via charging circuitry 226. The battery 224 is further coupled to the input of the switched mode power supply 202 and/or to another electrical output via discharging circuitry 228.

The charging circuitry 226 converts the output of the generator 34 to power suitable for charging the battery 224, which may be based on a type of the battery 224 (e.g., a battery chemistry, a nominal output voltage, a battery output current capacity, etc.), and may include rectification circuitry and/or voltage conversion circuitry to convert the output of the generator 34 to power to charge the battery 224. The example discharging circuitry 228 converts power from the battery 224 to supply one or more output loads, which may replace and/or supplement the power output by the generator 34 driven by the engine 32. The discharging circuitry 228 may include voltage conversion circuitry, conditioning circuitry, load balancing circuitry, and/or any other circuitry for providing power from the battery 224 to one or more outputs. Example implementations of supplying battery power to supplement welding-type power are disclosed in U.S. Pat. No. 11,724,330 (Ulrich, et al.). The entirety of U.S. Pat. No. 11,724,330 is incorporated herein by reference.

The example control circuitry 208 controls the charging circuitry 226 to charge the battery 224 using engine power (e.g., via the generator 34) to selectively increase a load on the engine 32. Conversely, the control circuitry 208 controls the discharging circuitry 228 to discharge the battery 224 to selectively reduce a load on the engine 32 while maintaining the output of the power system 200. The control circuitry 208 may control the charge rate and/or discharging rate based on, for example, prioritizing battery health and/or based on the desired change in engine load to result in a corresponding change in brake specific fuel consumption. By controlling the charging and discharging of the battery 224, the example control circuitry 208 may increase the fuel efficiency of the engine 32 by operating the engine 32 at a lower brake specific fuel consumption for a given load and/or speed.

To determine whether to charge and/or discharge the battery 224 and/or to adjust an engine speed, the example control circuitry 208 may reference a predetermined relationship 230 between the load on the engine 32, the engine speed, and the fuel consumption of the engine 32. In some examples, the predetermined relationship 230 is stored in the memory 222 or other storage device, and is accessible by the control circuitry 208. An example predetermined relationship 230 may be stored as a lookup table, a map of values and/or functions, and/or any other storage or data format.

In some examples, the control circuitry 208 tracks fuel conservation relative to fuel consumption that would occur without the charging and discharging of the energy storage device based on the predetermined relationship. For example, the control circuitry 208 may calculate and store the amount of fuel that would be consumed at the engine load and engine speed without the charging and discharging. The calculated amount of fuel that would be consumed can be compared to the actual fuel consumed to calculate a fuel savings of the adjusted brake specific fuel consumption. Additionally or alternatively, the control circuitry 208 may calculate a fuel savings attributed to the changes in the engine speed and/or engine load over time.

The control circuitry 208 may take into account additional components of the power system 200 for determination of the fuel efficiency. In some examples, the control circuitry 208 controls charging or discharging of the battery 224 to increase a combined efficiency of the engine 32 and the generator 34 based on a load on the generator 34 and a predetermined relationship between the load on the generator 34 and an efficiency of the generator 34. For example, the predetermined relationship 230 (e.g., brake specific fuel consumption map) may be based on efficiency information for the generator 34. In other examples, the control circuitry 208 may control charging or discharging of the battery 224 to increase a combined efficiency of the engine 32 and other components, such as the switched mode power supply 202, the boost converter 212, the inverter 214, the output stage 218, the air compressor 38, and/or any other elements of the power system 200 that are powered by the engine 32. Additionally or alternatively, the efficiency information for each of the components may be used to provide stored energy from the battery 224 to reduce a load on the corresponding component. For example, if the generator 34 operates at the highest efficiency at a particular rotor speed and load, in some examples, the discharging circuitry 228 may be configured and/or controlled to output energy to supplement the generator 34 to place the generator 34 in a more efficient state.

Figure 2B:
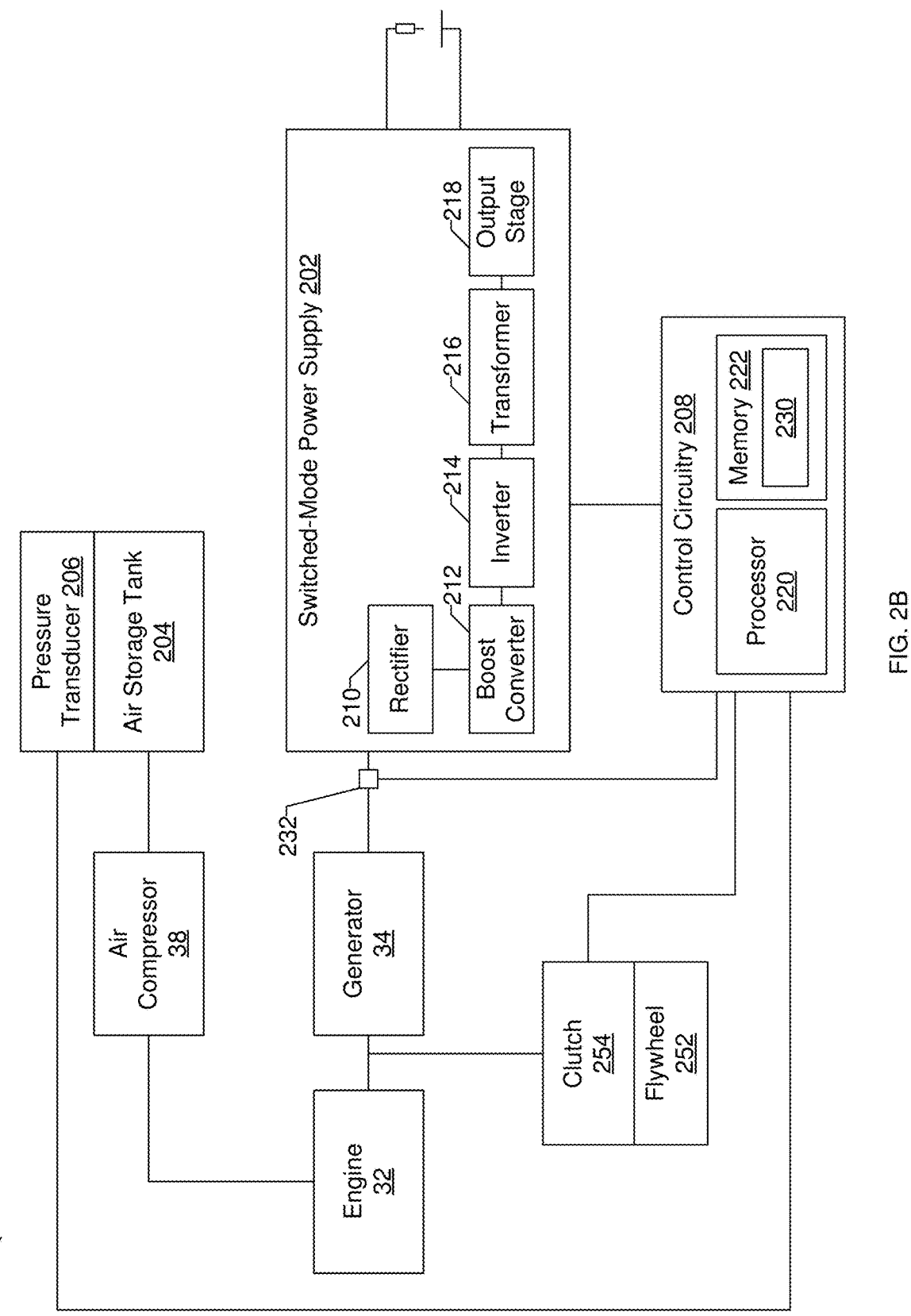
FIG. 2B is a block diagram of another example power system that may be used to implement the service pack of FIG. 1.
Figure 3:
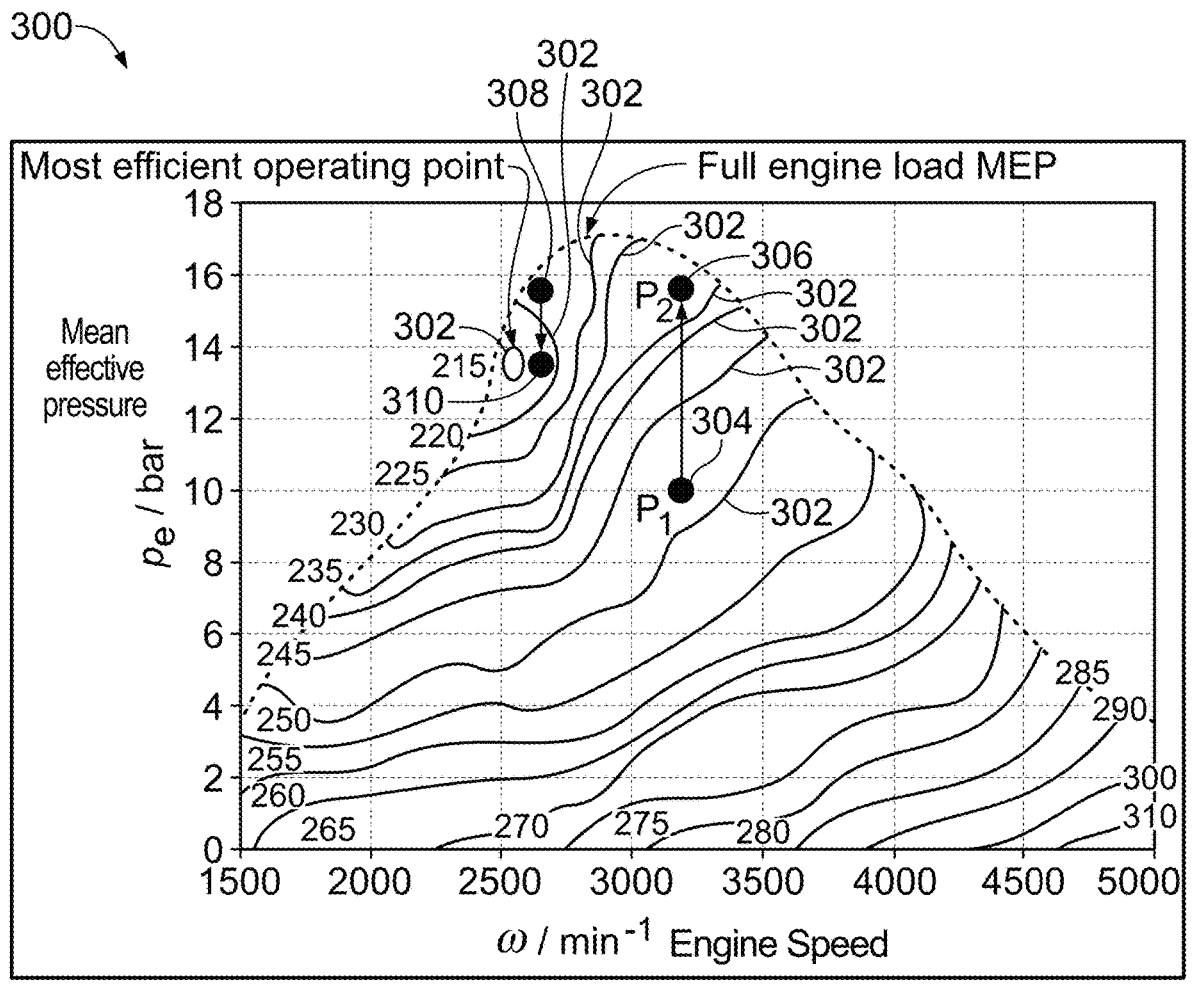
FIG. 3 illustrates an example brake specific fuel consumption map, and example changes to the engine operating points based on controlling charging and/or discharging of the energy storage device.

FIG. 3 illustrates example brake specific fuel consumption map 300 that may be used to implement the predetermined relationship 230 of FIGS. 2A and 2B. As illustrated in FIG. 3, the map 300 includes brake specific fuel consumption contours 302. The contours 302 illustrate the combinations of engine speed and engine load that result in a given brake specific fuel consumption value. The example control circuitry 208 may determine, based on the location on the map 300 using the engine speed and the engine load, that increasing or decreasing the engine load and/or increasing or decreasing the engine speed may result in achieving a combination of engine speed and engine load that correlates to a lower brake specific fuel consumption value on the map 300.

In the example of FIG. 3, a first point 304 represents an example operating point of the engine 32 according to the engine speed and the engine load (e.g., without charging or discharging of the battery 224). By analyzing the first point 304, the control circuitry 208 may determine that controlling the charging circuitry 226 to charge the battery 224 via the charging circuitry 226, thereby increasing the load on the engine 32, will reduce the brake specific fuel consumption value, and increase the efficiency of the engine 32, as illustrated by the shift from the first point 304 to a second point 306.

In another example, a third point 308 represents another operating point of the engine 32 according to the engine speed and the engine load. By analyzing the third point 308, the control circuitry 208 may determine that controlling the discharging circuitry 228 to discharge the battery 224 via the discharging circuitry 228, thereby reducing the load on the engine 32, will reduce the brake specific fuel consumption value, and increase the efficiency of the engine 32, as illustrated by the shift from the third point 308 to a fourth point 310.

In some examples, the control circuitry 208 may calculate and use a gradient vector at the location on the map 300 to determine the combination of speed change and load change to apply.

In some examples, the control circuitry 208 may be limited in the increase or decrease in load, and/or the increase or decrease in speed, that can be achieved using the battery 224 and/or while supporting the output load. In other words, the calculated change(s) in the load (via charging or discharging of the battery 224) and/or the engine speed may be constrained by the requirement to provide the output load. Additionally or alternatively, the calculated change(s) in the load (via charging or discharging of the battery 224) and the engine speed are determined based on the charge state of the battery 224. For example, when the battery 224 is in a depleted state, the control circuitry 208 will not make adjustments to the engine load that involve discharging the battery 224. Instead, the control circuitry 208 may adjust the engine speed such that the brake specific fuel consumption may be increased by increasing the load on the engine to charge the battery 224 via the charging circuitry 226.

In some examples, the control circuitry 208 switches between a storage mode and a discharge mode for determining adjustment(s) to the load on the engine 32 and engine speed. For example, while the charge state of the battery 224 is less than an upper threshold (e.g., 75%), the control circuitry 208 may calculate changes to the engine load and/or engine speed to increase the load on the engine 32 via the charging circuitry 226, unless other factors cause the control circuitry 208 to reduce the load. Conversely, while the charge state of the battery 224 is more than a lower threshold (e.g., 25%), the control circuitry 208 may calculate changes to the engine load and/or engine speed to decrease the load on the engine 32 via the discharging circuitry 228, unless other factors cause the control circuitry 208 to reduce the load. The control circuitry 208 may maintain a charging or discharging state while the engine 32 is in a substantially constant load state (e.g., while a same load is applied to the engine), even when the upper or lower threshold is crossed.

FIG. 2B is a block diagram of another example power system 250 that may be used to implement the service pack 12 of FIG. 1. The example power system 250 is identical to the example power system 200 of FIG. 2A, except that the power system 250 includes mechanical energy storage instead of the battery 224 for energy storage. As illustrated in FIG. 2B, the output of the engine 32 is coupled to a flywheel 252 via a clutch 254. The clutch 254 selectively couples the flywheel 252 to the mechanical output (e.g., a driveshaft) of the engine 32. The example control circuitry 208 controls the clutch 254 to selectively couple the flywheel 252 to the mechanical output of the engine 32 to store energy in the flywheel 252 (e.g., to increase the load on the engine 32) or discharge energy from the flywheel 252 to supplement the mechanical output of the engine 32 (e.g., to reduce the load on the engine 32). The control circuitry 208 may control the clutch 254 to charge and/or discharge the flywheel in a similar manner as the charging circuitry 226 and the discharging circuitry 228 to charge and discharge the battery 224 of FIG. 2A. In other examples, the flywheel 252 may be coupled to the driveshaft or other mechanical output of the engine 32 via a continuously variable transmission (CVT), or other type of controllable coupling, to allow energy to be added to the flywheel 252 and/or drawn from the flywheel 252.

While example electrical and mechanical energy storage devices are disclosed above, other electrical, mechanical, thermal, chemical, and/or other types of energy storage devices may be used. For example, the power systems 200 may replace the battery 224 and/or the flywheel 252 with ultracapacitors, supercapacitors, compressed air storage, thermal storage, gravitational storage, and/or any other type of energy storage.

In some examples, the control circuitry 208 updates the predetermined relationship (e.g., the brake specific fuel consumption map) based on measurements of the load on the engine 32, the engine speed, and the fuel consumption by the engine 32. For example, the control circuitry 208 may receive fuel consumption measurements (e.g., from a separate engine control unit, from fuel flow meter, etc.), engine load measurements (e.g., from a manifold absolute pressure sensor), and engine speed measurements (e.g., from an engine speed sensor). From the measurements, the control circuitry 208 calculates a brake specific fuel consumption value. While the predetermined relationship 230 may be stored in the memory 222 at the time of manufacture (or other time), the control circuitry 208 may observe differences between the stored relationship 230 and the operation of the engine 32. To further improve the fuel efficiency of the engine 32, the example control circuitry 208 updates the stored relationship 230 to reflect the measured fuel consumption of the engine 32.

Figure 4:
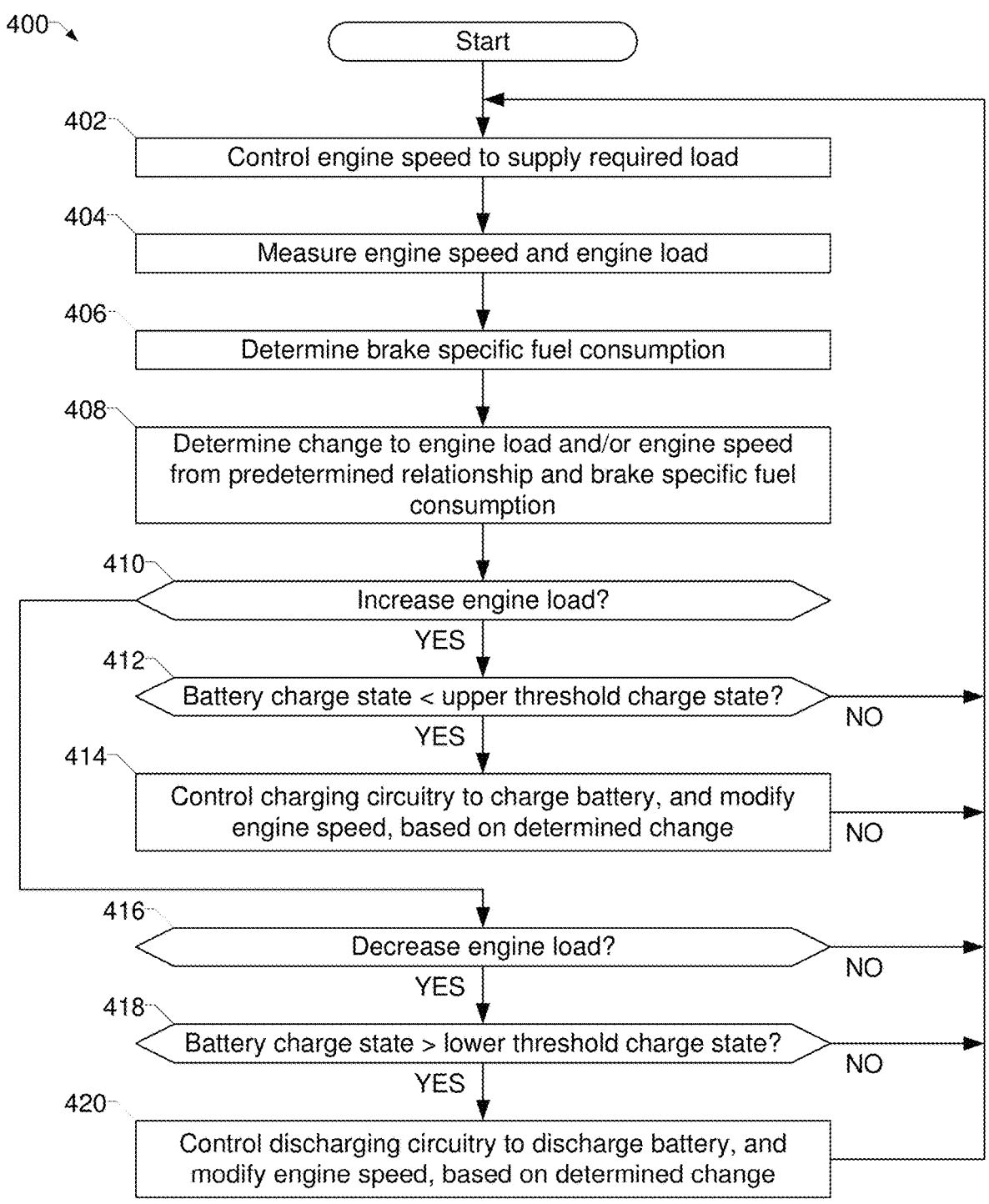
FIG. 4 is a flowchart representative of example machine readable instructions which may be executed by the control circuitry of FIGS. 2A and 2B to control charging and/or discharging of an energy storage device to improve fuel efficiency of the engine.

FIG. 4 is a flowchart representative of example machine readable instructions 400 which may be executed by the control circuitry 208 of FIGS. 2A and 2B to control charging and/or discharging of an energy storage device (e.g., the battery 224 of FIG. 2A, the flywheel 252 of FIG. 2B) to improve fuel efficiency of the engine 32. The example instructions 400 are described below with reference to the power system 200 of FIG. 2A, but may be modified to operate with other power systems including other types of energy storage devices.

At block 402, the control circuitry 208 controls an engine speed of the engine 32 to supply a required load. For example, the control circuitry 208 may control the engine 32 to have a speed sufficient to supply load(s) drawn by the switched mode power supply 202, the air compressor 38, and/or any other loads (e.g., an AC output of the generator 34, a hydraulic output, etc.). At block 404, the control circuitry 208 measures an engine speed and an engine load. For example, the control circuitry 208 may obtain an engine speed from an engine speed sensor. The control circuitry 208 may receive an engine load from a manifold air pressure sensor, a mass air flow sensor, a generator current draw, generator voltage, and/or other direct and/or indirect measurements.

At block 406, the control circuitry 208 determines a brake specific fuel consumption value based on the measured engine speed and the engine load. The control circuitry 208 may calculate the brake specific fuel consumption and/or determine the brake specific fuel consumption based on a predetermined relationship (e.g., the relationship 230 stored in the memory 222) and the measured engine speed and the engine load.

At block 408, the control circuitry 208 determines a change to the engine load and/or to the engine speed, based on the predetermined relationship and the determined brake specific fuel consumption, to improve the fuel efficiency of the engine 32. For example, the control circuitry 208 may determine a gradient of the brake specific fuel consumption at the measured engine speed and engine load according to the predetermined relationship. From the gradient, the control circuitry 208 may determine a combination of engine speed change and engine load change to reduce the brake specific fuel consumption value and increase the fuel efficiency.

At block 410, the control circuitry 208 determines whether the change in engine load involves increasing the engine load. If the change in engine load involves increasing the engine load (block 410), the control circuitry 208 determines whether a charge state of the battery 224 is less than an upper threshold charge state. The upper threshold charge state may be selected based on, for example, a capacity of the battery 224 and/or a selected charge rate of the battery 224.

If the charge state of the battery 224 is less than the upper threshold charge state (block 412), at block 414 the control circuitry 208 controls the charging circuitry 226 to charge the battery 224, and modify the engine speed, based on the determined change (block 408). After controlling the charging circuitry (block 414), or if the battery charge state is more than the upper threshold charge state (block 412), control returns to block 402 to control the engine speed to supply the required load (which may be increased by the additional load presented by the charging circuitry 226).

If the change in engine load does not involve increasing the engine load (block 410), at block 416 the control circuitry 208 determines whether the change in engine load involves decreasing the engine load. If the change in engine load involves decreasing the engine load (block 416), at block 418 the control circuitry 208 determines whether a charge state of the battery 224 is more than a lower threshold charge state. The lower threshold charge state may be selected based on, for example, the capacity of the battery 224 and/or a selected discharge rate of the battery 224.

If the charge state of the battery 224 is more than the lower threshold charge state (block 418), at block 420 the control circuitry 208 controls the discharging circuitry 228 to convert energy from the battery 224 to supplement electrical power provided by the generator 34, and modify the engine speed, based on the determined change (block 408). After controlling the discharging circuitry (block 420), or if the battery charge state is more than the upper threshold charge state (block 418), control returns to block 402 to control the engine speed to supply the required load (which may be decreased due to the additional energy provided by the discharging circuitry 228).

It should be noted that certain applications may call for electrical power from the service pack and compressed air only, without a need for hydraulic service. On the contrary, other applications may call for electrical power and hydraulic service, without the need for compressed air. Applications of the latter type may include manlifts, bucket trucks and the like. In such cases, disclosed examples may include integration of the service pack support systems with those of the main vehicle power plant, but without either the air compressor or the hydraulic pump, and the ancillary components used to support those elements, such as hoses, conduits and so forth.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven power system, comprising:

an engine configured to output mechanical power;

a generator configured to convert the mechanical power to first electrical power;

an energy storage device configured to be charged using the first electrical power and to discharge stored energy to output second electrical power;

a storage device configured to store a brake specific fuel consumption map relating a load on the engine, an engine speed, and fuel consumption of the engine; and control circuitry configured to:

determine a load on the engine and an engine speed;

determine a brake specific fuel consumption value based on the load, the engine speed, and the brake specific fuel consumption map;

determine a gradient vector at the brake specific fuel consumption value on the brake specific fuel consumption map;

based on the gradient vector, determine a combination of engine speed change and load change; and based on the load change, control charging circuitry to charge of the energy storage device to increase a fuel efficiency of the engine by increasing the load or control discharging circuitry to convert energy from the energy storage device to increase a fuel efficiency of the engine by decreasing the load; and based on the engine speed change, control the engine to change the engine speed.

2. The engine-driven power system as defined in claim 1, further comprising welding-type power conversion circuitry configured to convert at least a portion of the first electrical power to welding-type output power.

3. The engine-driven power system as defined in claim 2, wherein the welding-type power conversion circuitry is configured to convert at least a portion of the second electrical power to the welding-type output power, the control circuitry configured to control input of the first electrical power and the second electrical power to the welding-type power conversion circuitry to increase the fuel efficiency of the engine.

4. The engine-driven power system as defined in claim 1, wherein the control circuitry is configured to control at least one of the charging or discharging of the energy storage device or the engine speed based on a charge state of the energy storage device.

5. The engine-driven power system as defined in claim 1, further comprising a load sensor configured to measure the load on the engine.

6. The engine-driven power system as defined in claim 1, wherein the control circuitry is configured to determine the load on the engine and the engine speed using an engine control unit.

7. The engine-driven power system as defined in claim 1, wherein the charging circuit is configured to convert the first electrical power to charge the energy storage device, wherein the control circuitry is configured to control the charging circuit to charge the energy storage device to increase the load on the engine to improve the fuel efficiency when the fuel efficiency is less than a calculated fuel efficiency based on the engine speed.

8. The engine-driven power system as defined in claim 1, wherein the discharging circuit is configured to convert the second electrical power to supplement the first electrical power, wherein the control circuitry is configured to control the discharging circuit to discharge the energy storage device to reduce the load on the engine to improve the fuel efficiency when the fuel efficiency is less than a calculated fuel efficiency based on the engine speed.

9. The engine-driven power system as defined in claim 1, wherein the charging circuit is configured to convert the first electrical power to charge the energy storage device, wherein the control circuitry is configured to control the charging circuit to charge the energy storage device to increase the load on the engine and adjust the engine speed to improve the fuel efficiency.

10. The engine-driven power system as defined in claim 1, wherein the discharging circuit is configured to convert the second electrical power to supplement the first electrical power, wherein the control circuitry is configured to control the discharging circuit to discharge the energy storage device to reduce the load on the engine and adjust the engine speed to improve the fuel efficiency.

11. The engine-driven power system as defined in claim 1, wherein the control circuitry is configured to control charging or discharging of the energy storage device to increase a combined efficiency of the engine and the generator based on a load on the generator and a predetermined relationship between the load on the generator and an efficiency of the generator.

12. The engine-driven power system as defined in claim 1, further comprising:

a rectifier configured to rectify the first electrical power;

a boost converter configured to convert the rectified first electrical power to intermediate power; and a switched mode power supply configured to convert the intermediate power to output power, wherein the control circuitry is configured to control the switched mode power supply based on an output load, and control, based on an efficiency of the boost converter corresponding to the engine speed, at least one of the charging or discharging of the energy storage device or the engine speed to increase a fuel efficiency of the engine.

13. The engine-driven power system as defined in claim 1, wherein the control circuitry is configured to update the brake specific fuel consumption map in response to measurements of the load on the engine, the engine speed, and the fuel consumption by the engine.

14. The engine-driven power system as defined in claim 1, wherein the control circuitry is configured to track fuel conservation relative to fuel consumption that would occur without charging and discharging of the energy storage device based on the predetermined relationship.

15. A method to control an engine-driven power system, comprising:

outputting mechanical power using an engine;

converting the mechanical power to first electrical power using a generator;

accessing, via control circuitry, brake specific fuel consumption map relating a load on the engine, an engine speed, and fuel consumption of the engine;

determining, via the control circuitry, a load on the engine and an engine speed of the engine;

determining, via the control circuitry, a brake specific fuel consumption value based on the load, the engine speed, and the brake specific fuel consumption map;

determining, via the control circuitry, a gradient vector at the brake specific fuel consumption value on the brake specific fuel consumption map;

based on the gradient vector, determining, via the control circuitry, a combination of engine speed change and load change;

based on the engine speed change, controlling, via the control circuitry, the engine to change the engine speed; and based on the load change:

controlling, via the control circuitry, a charging circuit to convert at least a portion of the first electrical power to charge an energy storage device to increase the load on the engine to increase fuel efficiency of the engine; or controlling, via the control circuitry, a power conversion circuit to convert second electrical power from the energy storage device to supplement the first electrical power to increase the fuel efficiency of the engine.

\* \* \* \* \*